(12) United States Patent
Pemmaraju et al.

(10) Patent No.: US 10,509,813 B1
(45) Date of Patent: Dec. 17, 2019

(54) SYSTEM AND METHOD FOR ANALYZING AND MODELING CONTENT

(71) Applicant: Droit Financial Technologies LLC, New York, NY (US)

(72) Inventors: Satyanarayana V. Pemmaraju, New York, NY (US); Joceline H. Zheng, New York, NY (US); Brock S. Arnason, New York, NY (US); E. Alexander Segura, Brooklyn, NY (US); Joseph A. Schwartz, Brooklyn, NY (US)

(73) Assignee: DROIT FINANCIAL TECHNOLOGIES LLC, New York, NY (US)

( * ) Notice: Subject to any disclaimer, the term of this patent is extended or adjusted under 35 U.S.C. 154(b) by 0 days.

(21) Appl. No.: 15/995,984

(22) Filed: Jun. 1, 2018

(51) Int. Cl.
| | |
|---|---|
| *G06F 16/335* | (2019.01) |
| *G06F 16/25* | (2019.01) |
| *G06F 16/35* | (2019.01) |
| *G06F 16/34* | (2019.01) |
| *G06F 17/27* | (2006.01) |
| *G06F 17/24* | (2006.01) |
| *G06Q 50/18* | (2012.01) |

(52) U.S. Cl.
CPC ......... *G06F 16/335* (2019.01); *G06F 16/254* (2019.01); *G06F 16/345* (2019.01); *G06F 16/35* (2019.01); *G06F 17/241* (2013.01); *G06F 17/2785* (2013.01); *G06Q 50/182* (2013.01)

(58) Field of Classification Search
None
See application file for complete search history.

(56) References Cited

U.S. PATENT DOCUMENTS

| 7,693,813 B1* | 4/2010 | Cao | G06F 17/30616 |
| | | | 707/999.001 |
| 2002/0026339 A1* | 2/2002 | Frankland | C10G 65/04 |
| | | | 705/7.12 |

(Continued)

OTHER PUBLICATIONS

Francesconi, Enrico, "Semantic Model for Legal Resources:Annotation and Reasoning over Normative Provisions", Semantic Web, vol. 7, No. 3, pp. 255-265, 2016, 9 pages.

(Continued)

*Primary Examiner* — James Trujillo
*Assistant Examiner* — John J Morris
(74) *Attorney, Agent, or Firm* — Wilson Sonsini Goodrich & Rosati

(57) ABSTRACT

Described herein are systems and methods for aggregating, parsing, and annotating regulatory context for use in resolving transactional inquiries. In one embodiment, a method comprises: aggregating documents from a plurality of data sources and storing the aggregated documents in a document database; selecting a first document from the document database; extracting regulatory content from the first document; parsing the regulatory content into a structured data object; identifying a substantively-relevant portion of the regulatory content in the structured data object; generating an annotation associated with the substantively-relevant portion; storing the generated annotation in an annotation database; and generating a domain-specific data structure for resolving transactional inquiries based on the annotation database.

26 Claims, 12 Drawing Sheets

(56) References Cited

U.S. PATENT DOCUMENTS

| | | |
|---|---|---|
| 2004/0243554 A1 | 12/2004 | Broder et al. |
| 2007/0011134 A1 | 1/2007 | Langseth et al. |
| 2009/0300471 A1 | 12/2009 | Dettinger et al. |
| 2013/0325849 A1* | 12/2013 | De .................. G06F 17/3071 707/722 |
| 2016/0103823 A1* | 4/2016 | Jackson, Jr. ........ G06F 17/2705 704/9 |

OTHER PUBLICATIONS

Biagioli, Carlo & Grossi, Davide, "Formal Aspects of Legislative Meta-Drafting", Frontiers in Artificial Intelligence and Applications, pp. 192-201, 2008, 10 pages.

PCT/US2019/034927 International Search Report and Written Opinion dated Aug. 9, 2019.

* cited by examiner

DOMAIN-SPECIFIC
DAT A STRUCTURE
370

```
mandate:
 name: mifir-post-trade-transparency
 version: 0.0.2
 phase-in: 2018-01-03 +0100
 phase-out: none
 taxonomy:
  regulator: [esma]
  mandate: [business-conduct]
  sub-mandate: [post-trade-transparency]
  asset-type: [otc-derivative, listed-derivative, equity, fixed-income-security]
 scopes:
  - scope:
    name: product
    inclusions:
     #TOTV products
     - include:
         in: esma-asset-class, [bond, equity, securitised-derivative, equity-derivative, interest-rate-derivative, emission-allowance-derivative, foreign-exchange-derivative, commodity-derivative, credit-derivative, structured-finance-product, contract-for-difference, c10-derivative, emission-allowance]
         is: totv, true exclusions:
     #FX Spot
     - exclude:
        is: esma-asset-class, foreign-exchange-derivative
        in: esma-sub-asset-class, [spot, deliverable-forward]
 ...

- scope:
    name: unilateral-party
 ...
  - scope:
    name: bilateral-party
 ...
  - scope:
    name: transaction-context
 ...
  - scope:
    name: obligations
 ...
```

FIG. 3B

STRUCTURED DATA
OBJECT 650

```
<paragraph eid="title[1]-article[1]-paragraph[5]" droit-id="article_1_5">
       <num title="5.">
              <p>5.</p>
       </num>
       <content>
              <p class="norm"> Title VIII of this Regulation applies to third-country
firms providing investment services or activities within the Union following an applicable
equivalence decision by the Commission with or without a branch.</p>
       </content>
</paragraph>
<paragraph eid="title[1]-article[1]-paragraph[5a]" droit-id="article_1_5a">
       <num title="5a.">
              <p>5a.</p>
       </num>
       <content>
              <p class="norm"> Title II and Title III of this Regulation shall not apply
to securities financing transactions as defined in point (11) of Article 3 of Regulation
(EU) 2015/2365 of the European Parliament and of the Council (<a href="#E0002"
id="src.E0002"><span class="superscript">2</span></a>).</p>
       </content>
</paragraph>
<paragraph eid="title[1]-article[1]-paragraph[6]" droit-id="article_1_6">
       <num title="6.">
              <p>6.</p>
       </num>
       <content>
              <p class="norm"> Articles 8, 10, 18 and 21 shall not apply...
```

FIG. 6C

SYSTEM AND METHOD FOR ANALYZING AND MODELING CONTENT

TECHNICAL FIELD

The present disclosure relates to parsing and analyzing document text. More specifically, the present disclosure relates to extracting content from aggregated text and analyzing the text to generate logical models.

BACKGROUND

The regulatory landscape is complex and rapidly evolving. Successful trading models require a complete understanding of the global rules of exchange, and compliant trading requires systematic, consistent, and auditable answers. The industry, however, faces numerous challenges. Due to the nature and timing of regulatory rule making, financial institutions have historically built tactical internal solutions, often segregated by asset class and/or by regime. Typically, such solutions operate post-execution, are expensive to maintain, do not allow for full traceability, and cannot offer a single view of the full global cross-regulatory implications of a trade. Without a single global eligibility and obligations decision layer that operates across asset class, it is exceedingly difficult, if not impossible, to manage a sustainable, consistent, auditable, and up-to-date approach.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 3B illustrates an exemplary domain-specific data structure in accordance with an embodiment of the present disclosure.

FIG. 6C illustrates a structured data object that includes regulatory content in accordance with an embodiment of the present disclosure.

DETAILED DESCRIPTION

Figure 1:
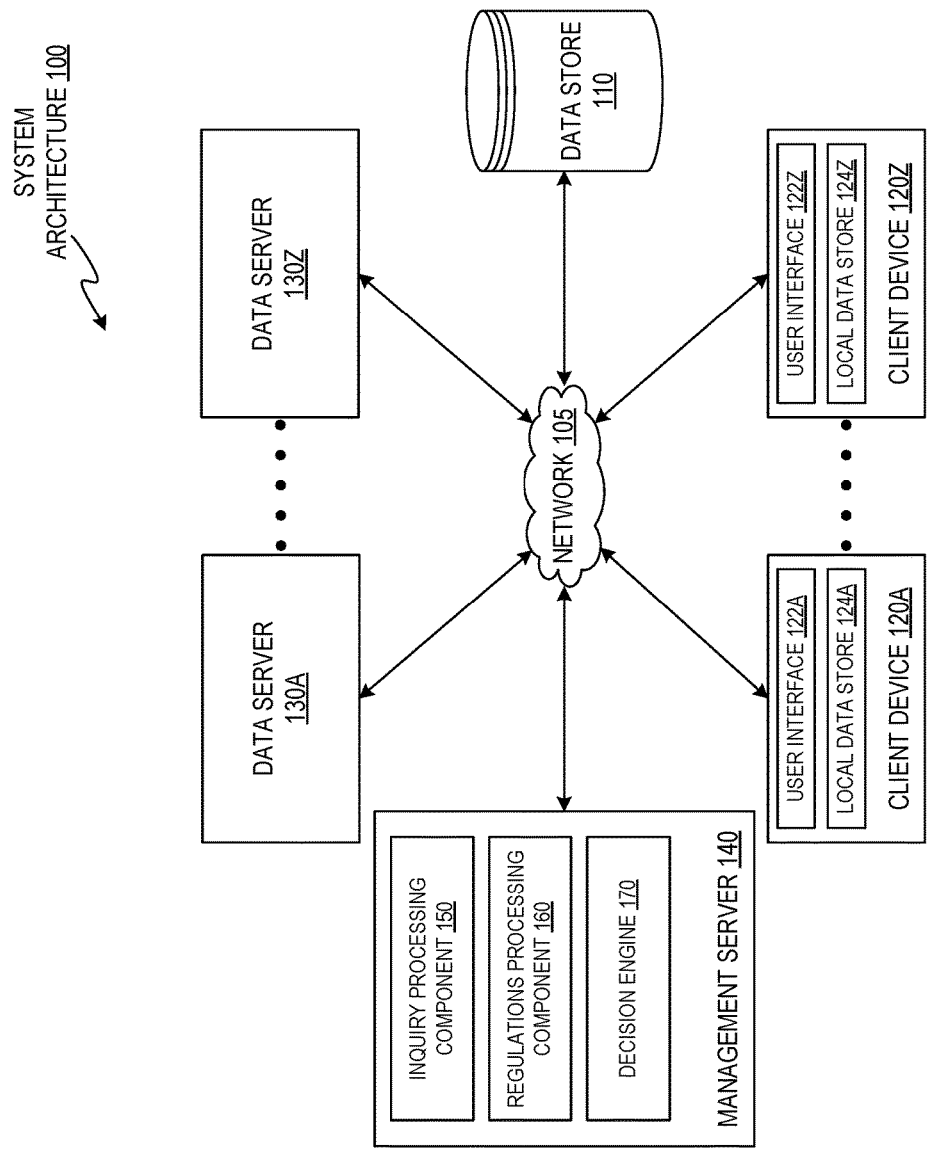
FIG. 1 illustrates an exemplary system architecture in accordance with an embodiment of the present disclosure.

Described herein are embodiments for aggregating, parsing, and annotating regulatory content for use in resolving transactional inquiries. Documents containing regulatory content are aggregated from various sources. The regulatory content is extracted, parsed, and analyzed to generate logical models for use in resolving the transactional inquiries and generating audit records.

The embodiments described herein provide a robust enterprise infrastructure facilitating compliant and optimal trading of derivatives and other financial instruments across asset classes, global regulatory regimes, central counterparties (CCPs), and execution platforms. Implementation of the embodiments give rise to complex and up-to-date rule/data packages and decision-making methodologies, which may provide a strategic and holistic approach to regulatory pre-trade and post-execution decision-making with full traceability within real-time trading systems. By modeling digitized regulatory law, complete traceability from all inquiries into human readable decision tree logic is made possible. In addition, the embodiments address global cross-regulatory implications of a trade, and can help parties determine who it is they can trade with, what can be traded, and where the trading can occur.

The embodiments of the present disclosure further facilitate regulatory compliance, for example, by improving parties' abilities to follow vetted and transparent regulatory workflows consistently and globally across all asset classes. Complete updates to rule models can occur within two to five days of regulatory change, allowing for suitable time to fully document and test the models. The embodiments further provide full audit records and visualization capabilities to provide a robust framework for violation analysis and remediation. In addition, the embodiments provide a basis for a robust surveillance system for identifying systemic regulatory rule avoidance.

Certain embodiments of the present disclosure further reduce data redundancy and allow faster and more accurate processing of regulatory content. For example, changes in regulations and rules can be identified automatically, and new information can be retrieved by detecting changes within known regulatory documents without retrieving and parsing information that was processed previously. This reduces the overall amount of aggregated data, thus reducing the amount of processing time to generate annotations and perform logical modeling.

Certain embodiments of the present disclosure further allow for the processing of multiple transactional inquiries (e.g., on the order of thousands per second). The domain-specific data structures described herein allow for efficient transaction resolution and fast decision-making, resulting in detailed audit records for every client request. This is due in part to the generation of decisional models based on the methods described herein for parsing and annotating regulatory text, and defining a logical structure for decision making based on the annotations, their defined scopes, context, and logical associations to each other. Moreover, the domain-specific data structures can be updated as new annotations are generated, allowing for up-to-date resolution of transactional inquiries.

Certain embodiments of the present disclosure provide for the resolution of transactional inquiries based on mandates and scopes. In evaluating a mandate, two questions are addressed: (1) whether a mandate applies to the given scenario (referred to as "eligibility" or "transaction eligibility"), and (2) if the mandate does apply, what the obligations are and how to fulfill them. Transaction eligibility can have different categories, such as product scope, bilateral party scope, unilateral party scope, and transaction context scope.

Product scope relates to the issue of whether a given product described in terms of its economic characteristics is in scope for a given mandate. A negative outcome indicates that the product is out of scope for the mandate under consideration, regardless of what parties are trading it and under what context. That is, a transaction regarding a product deemed to be out of scope at this level may still be out of scope once regardless of other transaction and party facts considered. In modeling the decision logic, inputs pertaining to product scope include trade economic facts, such as, but not limited to: International Swaps and Derivatives Association (ISDA) taxonomy (e.g., a regulator may exclude an entire "commodity" asset class from the definition of OTC derivatives); spot transaction attributes (e.g., for identification and/or exclusion of commodity transactions settled physically and strictly within the spot settlement period); and key swap terms for defining products under clearing or execution mandates (e.g., currencies, maturity, floating rate option, credit index name).

Unilateral party scope may be evaluated for each counterparty involved in a transaction independently, regardless of trade economics or any other transaction-level facts. That is, it may be strictly evaluated at the entity level using only facts about that party. A negative outcome for this scope indicates that the party in question is never in scope for the mandate of concern, regardless of what transaction it may enter into (e.g., EMIR Article 1 paragraph 4 is an example of a negative unilateral party scope). A positive outcome, however, indicates that the particular mandate/regulation of interest does generally apply to the party, but not necessarily to all transactions to which it is a counterparty. For example, a U.S. swap dealer is in scope generally for Part 43 real-time reporting obligations. However, if it is facing an internal affiliate, then the intra-affiliate transaction is not eligible for Part 43 obligations.

Bilateral party scope considers a pair of trading parties to determine whether the pair, regardless of what product they are trading and how, may fall within scope for a given mandate. A negative outcome indicates that the pair of parties will not be eligible for the given mandate obligation, whereas a positive outcome indicates that the pair of parties may be eligible. Bilateral scope computation includes unilateral party scopes for the two parties, plus additional logic. Inputs include party facts from both counterparties. Examples include intra-group exemptions (e.g., certain intra-group risk transfers between affiliates are often excluded from clearing and execution mandates) and cross-border or extraterritoriality rules (e.g., Commodity Futures Trading Commission (CFTC) cross-border guidance considers parties on a bilateral basis).

Transaction context scope relates to decisions where both trade economic attributes and party attributes are expected in the inputs. Relevant contextual details may include the following: platform and venues (e.g., whether a transaction is facing a clearing house; whether a transaction is executed on certain specified platforms); indicators related to trade lifecycle events (e.g., portfolio compression, inter-affiliate risk transfer, or option exercise into underlying swap); place of conduct (typically occurs at this level, using results from bilateral party scope plus trader and/or sales staff location information, provided on per-transaction basis as trade facts); party and product phase-ins; exemptions that depend upon the intent or activities of parties (e.g., hedging and commercial purpose exemptions); and various types of temporary relief (e.g., no-action letters).

Transaction eligibility encompasses the aforementioned product scope, bilateral party scope, and transaction context scope to determine eligibility (i.e., whether a transaction is in scope for the mandated obligations). If a transaction is deemed eligible for a given mandate, the obligations are determined. The obligations indicate what actions are required and how to fulfill them. "Core" obligations are those that are standardized across mandates. Available facts include who is the bearer of the obligations, the timeframe during which each obligation must be fulfilled, and relevant market infrastructure providers (e.g., trade repositories for reporting mandates, clearing venues for clearing mandates, etc.).

"Extra" obligations relate to idiosyncrasies of different mandates and different regulatory regimes. For example, for transaction reporting mandates, the "extra" obligations may relate to the types of reports to submit, references to a specific form to use in the report submission, applicable block sizes in public dissemination, and clearing or electronic execution mandates which provide data for parties to determine whether notional masking applies and what the value is. The separation between standardized "core" and mandate-specific "extra" obligations is to allow for improved processing efficiency and logical coherence. If a transaction is not eligible for complying with a given mandate, no obligations will be indicated (i.e., a corresponding data structure field for obligations will be empty).

FIG. 1 illustrates an exemplary system architecture 100, in accordance with an embodiment of the present disclosure. The system architecture 100 includes a data store 110, client devices 120A-120Z, data servers 130A-130Z, and a management server 140, with each device of the system architecture 100 being communicatively coupled via a network 105. One or more of the devices of the system architecture 100 may be implemented using computer system 900, described below with respect to FIG. 9.

In one embodiment, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. Although the network 105 is depicted as a single network, the network 105 may include one or more networks operating as a stand-alone networks or in cooperation with each other. The network 105 may utilize one or more protocols of one or more devices to which they are communicatively coupled. The network 105 may translate to or from other protocols to one or more protocols of network devices.

In one embodiment, the data store 110 may include one or more of a short-term memory (e.g., random access memory), a cache, a drive (e.g., a hard drive), a flash drive, a database system, or another type of component or device capable of storing data. The data store 110 may also include multiple storage components (e.g., multiple drives or multiple databases) that may also span multiple computing devices (e.g., multiple server computers). In some embodiments, the data store 110 may be cloud-based. One or more of the devices of system architecture 100 may utilize their own storage and/or the data store 110 to store public and private data, and the data store 110 may be configured to provide secure storage for private data. In some embodiments, the data store 110 may be used for data back-up or archival purposes.

The client devices 120A-120Z may each include computing devices such as personal computers (PCs), laptops, mobile phones, smart phones, tablet computers, netbook computers, etc. Client devices 120A-120Z may also be referred to as "user devices" or "mobile devices". An individual user may be associated with (e.g., own and/or use) one or more of the client devices 120A-120Z. The client devices 120A-120Z may each be owned and utilized by different users at different locations. As used herein, a "user" may be represented as a single individual. However, other embodiments of the present disclosure encompass a "user" being an entity controlled by a set of users and/or an automated source. For example, a set of individual users federated as a community in a company or government organization may be considered a "user".

Figure 4:
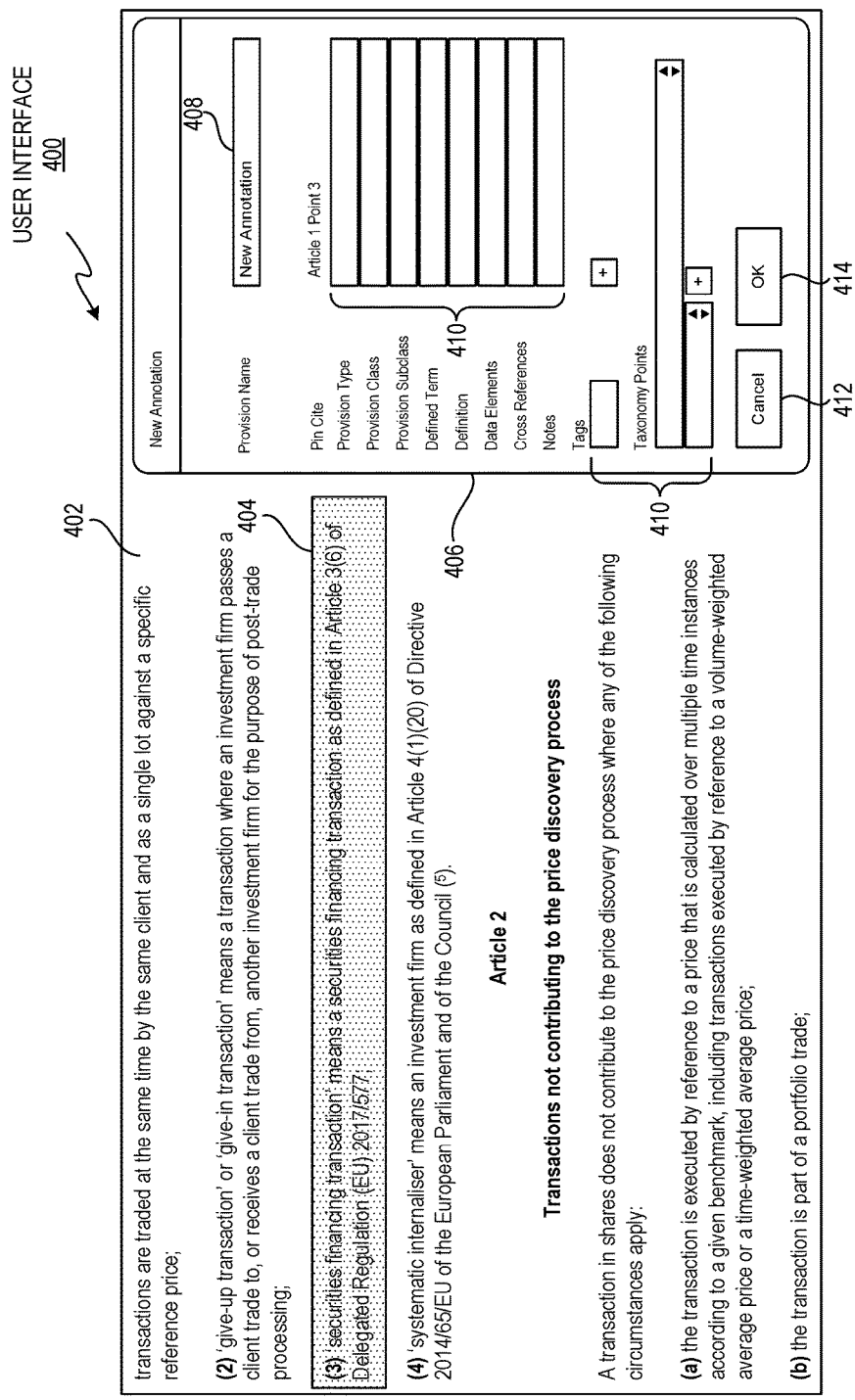
FIG. 4 illustrates an exemplary user interface for generating or editing an annotation in accordance with an embodiment of the present disclosure.
Figure 6A:
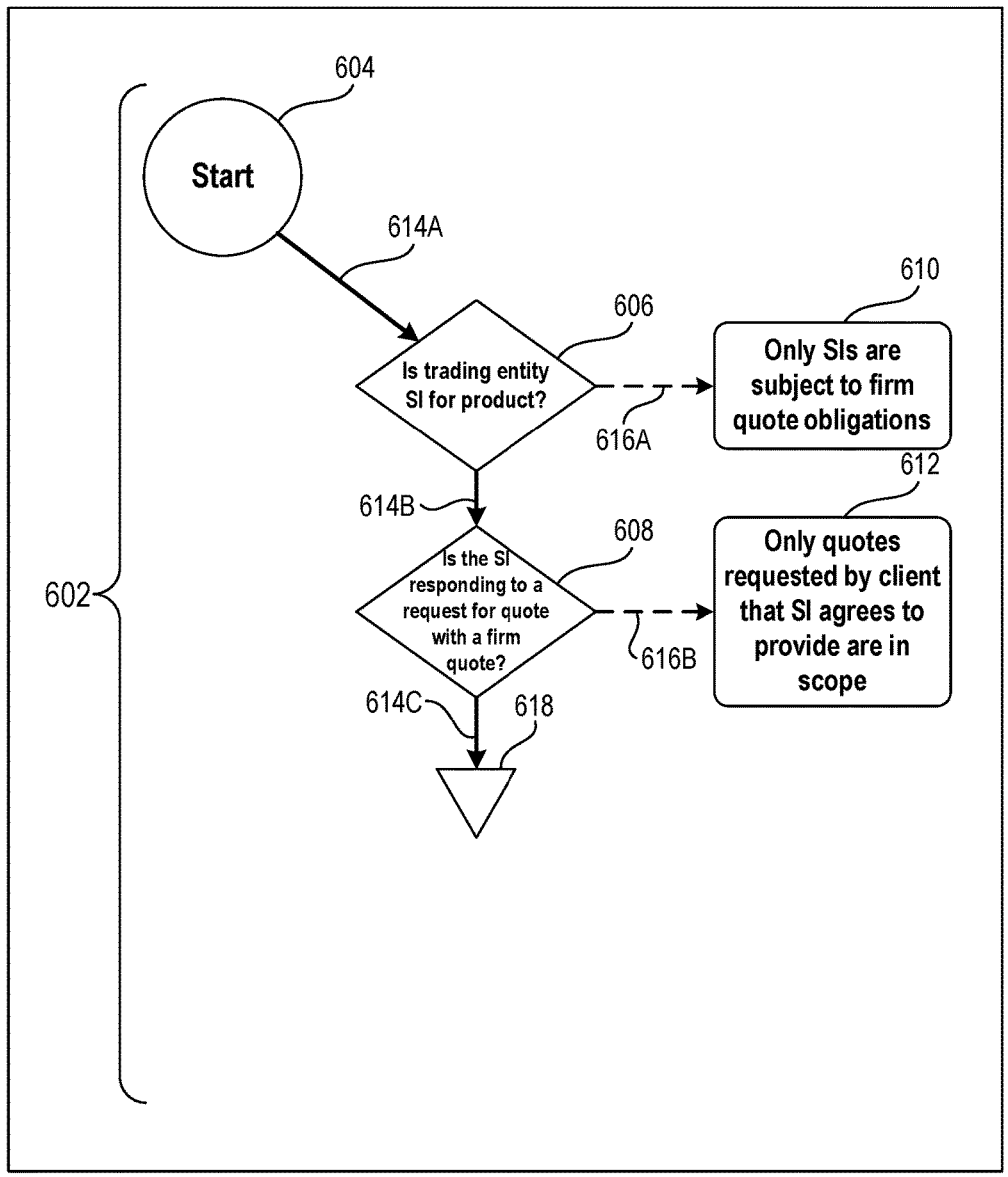
FIG. 6A illustrates an exemplary user interface providing visualization of a transactional inquiry in accordance with an embodiment of the present disclosure.
Figure 6B:
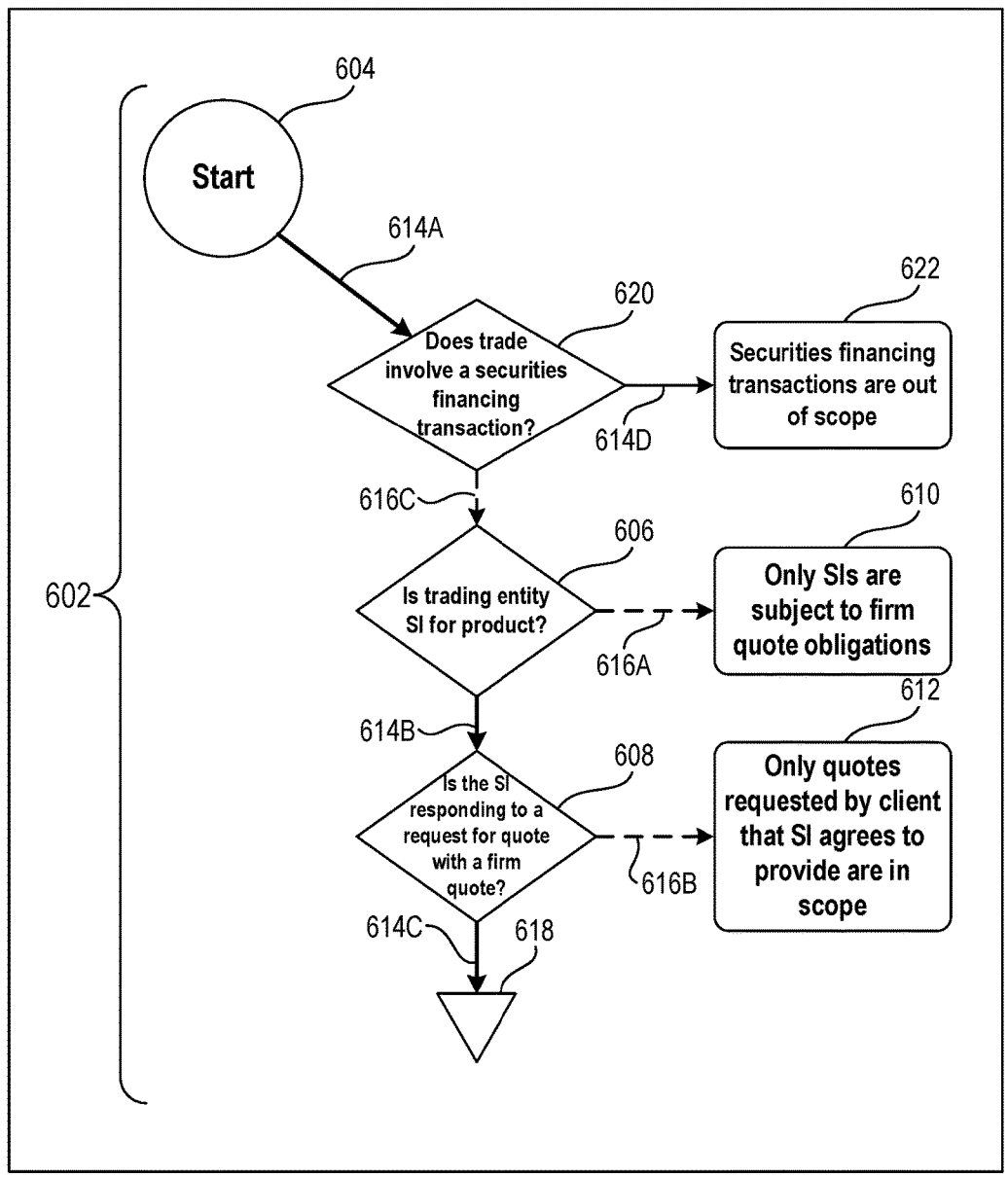
FIG. 6B illustrates an exemplary user interface providing updated visualization of a transactional inquiry in accordance with an embodiment of the present disclosure.

The client devices 120A-120Z may each implement user interfaces 122A-122Z, respectively. Each of the user interfaces 122A-122Z may allow a user of the respective client device 120A-120Z to send/receive information to/from each other, the data store 110, one or more of the data servers 130A-130Z, and the management server 140. For example, one or more of the user interfaces 122A-122Z may be a web browser interface that can access, retrieve, present, and/or navigate content (e.g., web pages such as Hyper Text Markup Language (HTML) pages) provided by the management server 140. As another example, one or more of the user interfaces 122A-122Z may enable data visualization with their respective client device 120A-120Z. In one embodiment, one or more of the user interfaces 122A-122Z may be a standalone application (e.g., a mobile "app", etc.), that allows a user of a respective client device 120A-120Z to send/receive information to/from each other, the data store 110, one or more of the data servers 130A-130Z, and the analysis server 130. FIGS. 4, 6A, and 6B provide examples of user interfaces in accordance with the embodiments described herein, and are discussed in greater detail below.

The client devices 120A-120Z may each utilize local data stores 124A-124Z, respectively. Each of the local data stores 124A-124Z may be internal or external devices, and may include one or more of a short-term memory (e.g., random access memory), a cache, a drive (e.g., a hard drive), a flash drive, a database system, or another type of component or device capable of storing data. The local data stores 124A-124Z may also include multiple storage components (e.g., multiple drives or multiple databases) that may also span multiple computing devices (e.g., multiple server computers). In some embodiments, the local data stores 124A-124Z may be used for data back-up or archival purposes.

In one embodiment, the data servers 130A-130Z may each include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components from which content items and metadata may be retrieved/aggregated. In some embodiments, one or more of the data servers 130A-130Z may be a server utilized by any of the client devices 120A-120Z or the management server 140 to retrieve/access content or information pertaining to content (e.g., content metadata).

In some embodiments, the data servers 130A-130Z may serve as sources of content that can be provided to any of the devices of the system architecture 100. The data servers 130A-130Z may host various types of content, including, but not limited to, editable online encyclopedia articles, online news articles, online forums, and video content. In some embodiments, the data servers 130A-130Z may specialize in particular types of content (e.g., a first content server that hosts video content, another content server that hosts online articles, etc.). In some embodiments, one or more of the data servers 130A-130Z may host shared content, private content (e.g., content restricted to use by a single user or a group of users), commercially distributable content, etc. In some embodiments, one or more of the data servers 130A-130Z may maintain content databases, which can include records of content titles, descriptions, keywords, cross-references to related content or associated content, and metadata (e.g., describing edits or updates to the content). In some embodiments, one or more of the data servers 130A-130Z may be associated with or maintained by government entities, which may make the content publicly available for retrieval. In some embodiments, the content includes documents containing regulatory content, which may be available in formats such as PDF, HTML, XML, or other suitable document formats.

In one embodiment, the management server 140 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to retrieve and process documents in accordance with the various embodiments described herein. The management server 140 includes an inquiry processing component 150, a regulations processing component 160, and a decision engine 170, which will be described below in detail with respect to FIG. 2.

Figure 2:
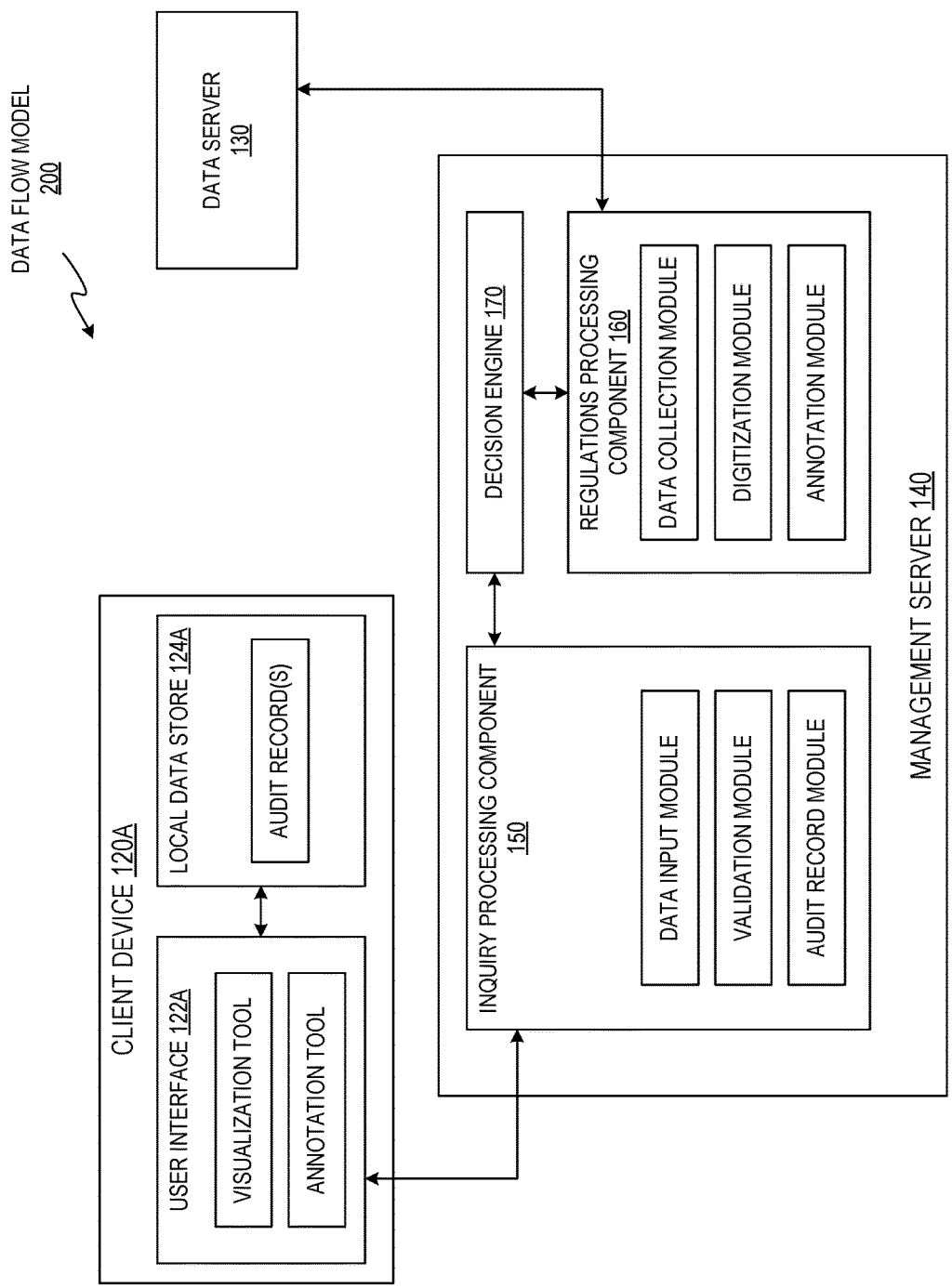
FIG. 2 illustrates an exemplary data flow model in accordance with an embodiment of the present disclosure.

FIG. 2 is a block diagram illustrating an exemplary data flow model 200 in accordance with an embodiment of the present disclosure. The data flow model 200 illustrates the data flow between the client device 120A, the data server 130, and the management server 140.

In certain embodiments, the user interface 122A of the client device 120A may utilize a visualization tool in order to visualize data generated by the various embodiments described herein. For example, the visualization tool may comprise software installed on the client device 120A, or may be implemented as a web interface. The visualization tool may allow a user of the client device 120A to visualize rule implementation, view audit records (e.g., as illustrated in FIGS. 6A and 6B) to visualize how decisions were made along with the data used to render the decisions, compare versions of rules, and allow for human review of rule implementation, rule vetting, and decision validation. The annotation tool of the user interface 122A may allow for generation and modification of annotations associated with regulatory text, as is illustrated in FIG. 4. In some embodiments, the management server 140 may also implement a visualization tool to provide similar functionality to operators of the management server 140.

In one embodiment, inquiry processing component 150 may receive an inquiry directly from the client device 120A. The inquiry may be a transactional inquiry that a user of the client device 120A seeks to resolve. The inquiry processing component 150 may evaluate and parse the inputs using a data input module, and may retrieve decisional logic for resolving the inquiry from the decision engine 170. Once the inquiry is resolved (e.g., obligations of a party are determined), the validation module may check the decisional logic for accuracy, and in some embodiments may provide an authorized operator of the management server 140 with an opportunity to review the decisional logic. The audit record module may be used to generate one or more audit records which detail path through the decisional logic and records all decisions made and inputs used. The audit record may be transmitted to the client device 120A for storage in its local data store 124A. In some embodiments, the audit record may be stored, alternatively or additionally, in other locations, such as the data store 110 or in a storage device of the management server 140.

In one embodiment, the management server 140 may utilize the regulations processing component 160 to aggregate documents from the data server 130A using a data collection module. The regulations processing component 160 may utilize a digitization module to extract regulatory content from the documents and store them, for example, in a structured data format. The annotation module is then used to generate annotations associated with regulatory content extracted from the documents and store and maintain the annotations in an annotation database. Using the decision engine 170, the management server 140 may model rules and regulations as decisional logic based on the generated annotations, which may be derived from multiple documents across multiple data sources. Details of how decisional logic is generated and how a transactional inquiry is processed will be described below with regard to FIGS. 3 and 5.

Although each of the data store 110, the client devices 120A-120Z, the data servers 130A-130Z, and the management server 140 are depicted in FIG. 1 as single, disparate components, these components may be implemented together in a single device or networked in various combinations of multiple different devices that operate together. In some embodiments, some or all of the functionality of the management server 140 may be performed by one or more of the client devices 120A-120Z, or other devices that are under control of the management server 140. For example, the client device 120A may implement a software application that performs the functions of the inquiry processing component 150, the regulations processing component 160, and/or the decision engine 170.

Figure 3A:
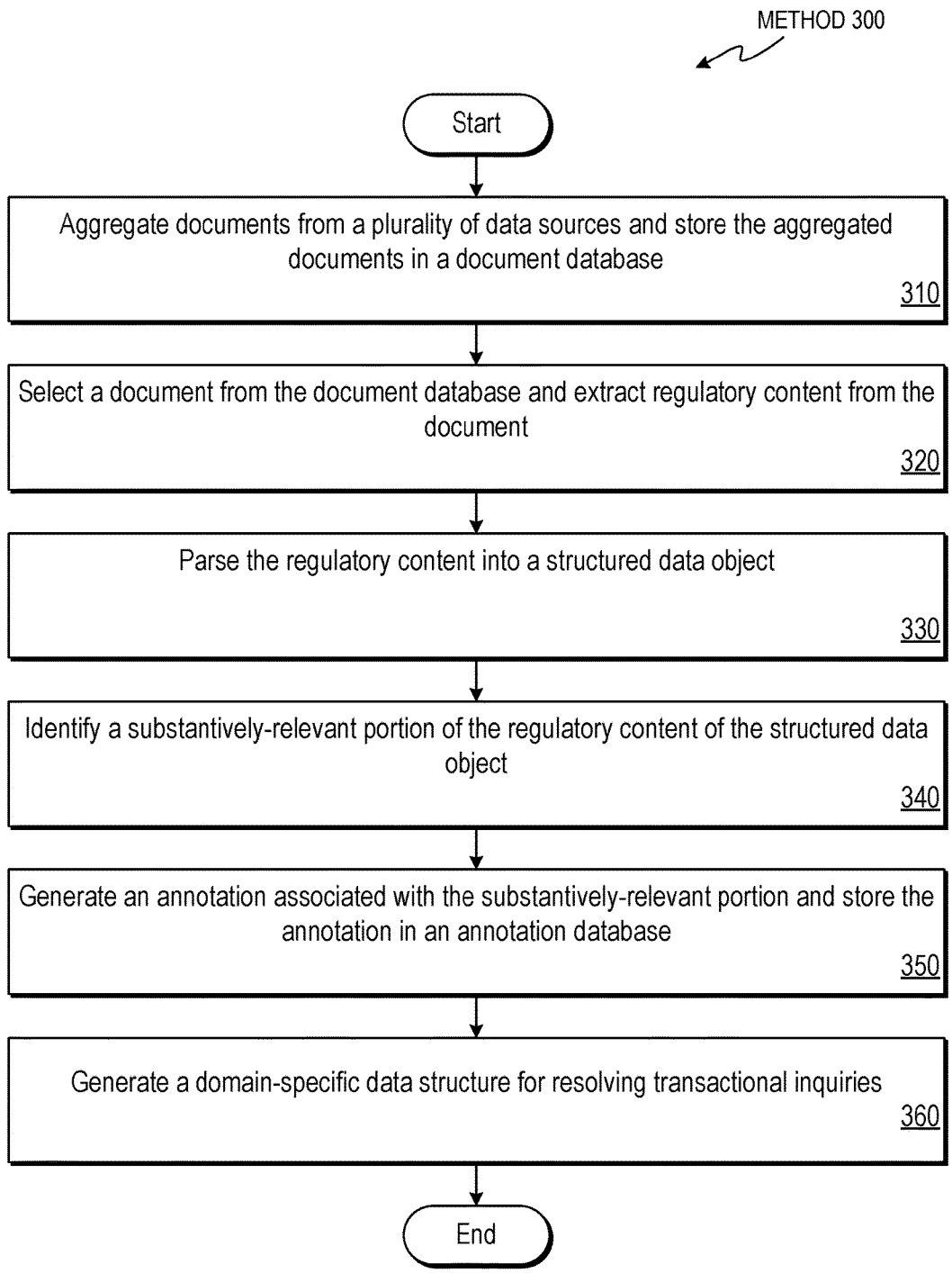
FIG. 3A is a flow diagram illustrating a method for aggregating, parsing, and annotating regulatory content in accordance with an embodiment of the present disclosure.

FIG. 3A is a flow diagram illustrating a method 300 for aggregating, parsing, and annotating regulatory content in accordance with an embodiment of the present disclosure. The method 300 may be performed by processing logic that includes hardware (e.g., circuitry, dedicated logic, programmable logic, microcode, etc.), software (e.g., instructions run on a processing device to perform hardware simulation), or a combination thereof. In one embodiment, the method 300 may be performed by a processing device executing one or more of the inquiry processing component 150, the regulations processing component 160, or the decision engine 170 described with respect to FIGS. 1 and 2. In some embodiments, the method 300 is executed by one or more processing devices of a server (e.g., the management server 140).

Referring to FIG. 3A, the method 300 begins at block 310 where a processing device (e.g., a processing device of the management server 140 executing a regulations processing component 260) aggregates documents from a plurality of data sources (e.g., one or more of the data servers 130A-130Z), and stores the aggregated documents in a document database (e.g., the data store 110 or other storage managed and maintained by the management server 140). Each document may include associated metadata that is also stored in the document database. For example, the metadata for a particular document may include, but is not limited to, a title of the document, a human-readable description or summary of the document, a source URL, a document format, instructions as to how the document should be aggregated (e.g., download the document and compare to another, compare specific content within an HTML page, etc.), indicators utilized for observing changes (e.g., HTML CSS selectors), a document version number, and/or a hash value. In some embodiments, the data sources include publicly available data sources associated with government entities, clearinghouses, or other entities that are sources of regulatory information and guidance.

In some embodiments, the documents comprise regulatory content such as rules and regulations pertaining to financial instruments (e.g., the European Union's MiFID-II regulatory framework). Regulatory content may include legal text pertaining to law and regulations promulgated by governments, as well as rules of venues that regarding particular products that may be submitted for clearing, internal corporate policies, or other documents that have regulatory effect or provide guidance as to how legal text is interpreted. In some embodiments, the metadata for one or more of the documents may also include a taxonomy of a particular mandate to which the document applies. In some embodiments, the plurality of data sources from which to aggregate the documents may be based on a target regulation category. For example, the processing device may be select data sources associated with a particular regulation or mandate. In other embodiments, the documents may not pertain to regulatory content in the context of financial instruments. For example, the documents may contain content describing laws, regulations, and rules governing the operation of autonomous or semi-autonomous vehicles, such as driverless cars and drone aircraft, as is discussed in detail with respect to FIG. 7.

In some embodiments, the processing device performs the aggregation periodically. For example, the processing device may access a configuration file that provides instructions for when the processing device should check access each data source. The configuration file may also log when sources have been accessed. In some embodiments, the configuration file may contain information describing which documents have been retrieved from the data sources, including, but not limited to, URLs, document titles, and document version information. In some embodiments, the configuration file may specify that new or modified documents should be downloaded automatically. In some embodiments, the processing device may transmit a notification to personnel (e.g., individuals authorized to access the management server 140) when new or modified documents are available for processing. The notification may contain information descriptive of the new or modified documents, such as a title, version, URL, and date of availability.

In some embodiments, the processing device may utilize an HTML content comparison to determine whether new or modified documents are available. For example, particular documents to observe may be identified using CSS selectors. For a given document, the configuration file may list all content in the document nodes that are specified in the document's metadata. Using this information, the processing device may ping the data source to determine if the document is modified or a new document becomes available at the data source, and in response retrieve and store the document in the document database.

In some embodiments, the processing device may identify one or more documents available from the plurality of data sources that have associated hash values (e.g., MD5 hash values) that differ from hash values associated with any of the documents previously stored in the document database, and then retrieve the one or more documents for storage in the document database. In some embodiments, for a particular document in the document database, the processing device may check for a copy of that document at its data source using a URL specified in the metadata of the document. The processing device may retrieve the copy of the document and compute its hash value. If the hash value is identical to that of the document from the document database, no further action is taken. If the hash values are determined to be different, this serves as an indicator to the processing device that the copy of the document at the data source corresponds to an updated version of the document from the document database. In some embodiments, the processing device then stores the updated version of the document in the document database, and may process the document (as discussed below) to extract any new content present.

At block 320, the processing device selects a document from the document database. The processing device then extracts regulatory content from the first document. The document, as well as the other documents in the document database, may be expressed in one of many formats, such as PDF, HTML, XML, or any other suitable document format known to those of ordinary skill in the art. In some embodiments, if the document comprises an image of text, text may be identified within the image using optical character recognition, and the identified text may be stored in the metadata of the document.

At block 330, the processing device parses the regulatory content into a structured data object representative of the content of the document. The structured data object may be expressed in a structured data format, such as Akoma Ntoso format. In other embodiments, other suitable structured data formats may be used. In some embodiments, the structured data format is independent of the format of the document. For example, the structured data format will express the parsed regulatory content in the same way regardless of whether the document from which the regulatory content is extracted was in PDF, HTML, or XML format.

At block 340, the processing device identifies a substantively-relevant portion of the regulatory content of the structured data object. As used herein, the term "substantively-relevant" refers to a type of alphanumeric data that is readable and understandable by a human reader and from which legal context can be derived, such as a legal rule, a definition, a reference to another legal rule, and commentary. In some embodiments, identifying the substantively-relevant portion comprises identifying tags or other identifiers that indicate a location of a specific portion of the content within the structured data object. In some embodiments, the processing device may identify the substantively-relevant portion by determining that a particular portion of content in the structured data object corresponds to content that was not present in a prior version of a document in the document database. For example, the processing device may compare content extracted from an updated version of a document to that of an older version of the document to determine if content has been added, deleted, or modified, and identify the added, deleted, or modified content as the substantively-relevant portion.

At block 350, the processing device generates an annotation associated with the substantively-relevant portion and stores the annotation in an annotation database. In some embodiments, multiple annotations may be generated for and associated with the document, which may each correspond to various substantively-relevant portions identified therein.

The annotation database may include annotations associated with the various documents in the document database. In certain embodiments, each annotation may comprise one or more rule-specific indicators, such as an indication of a group or individual responsible for generating the annotation (e.g., server-side or client-side), taxonomy of a rule, a scope to which an associated rule applies, a classification of the annotation, definition of a legislative term, a definition of a data element, a cross-reference to another annotation, or expressions of relationships between entities, between data elements, or between an entity and a data element. A "classification" of an annotation may be a descriptor of whether the associated legal provision is constitutive (e.g., a provision associated with creation, definition, or attribution) or regulative (e.g., a provision that prescribes a duty/obligation or a right, establishes a prohibition, or grants a permission). The taxonomy of a rule comprises information that may be used to classify and identify rules based on the rule's promulgator or regulator, a particular geographical region to which it applies, general products to which the rule applies, and mandate names. For example, the taxonomy may be used to identify specific rules that apply to a particular product in a particular geographical area. In some embodiments, the annotation includes a scope to which the associated rule applies, which may indicate a particular product to which the rule applies, whether the rule applies to a unilateral party (for each party involved in the transaction), whether the rule applies to a bilateral party (for parties considered together), a transaction context, or party obligations.

In some embodiments, the processing device may automatically extract the rules-specific indicators (and thus at least portions of the annotations themselves) from the substantively-relevant portion. The processing device may utilize a natural language processing algorithm to identify the rule-specific indicators in the substantively-relevant portion. For example, the processing device may determine that, based the use of particular language, grammar, and notation, particular text of the substantive-relevant portion corresponds to a legal definition.

In some embodiments, an annotation for the substantively-relevant portion may be generated in response to receiving a user input (e.g., from an individual authorized to access the management server 140 or a client-side user utilizing one of the client-devices 120A-120Z). For example, a user may specifically request to generate the annotation, edit a pre-existing annotation, or delete an annotation. FIG. 4 illustrates an exemplary user interface 400 for generating or editing an annotation. The user interface 400 includes a text region 402 for displaying regulatory text. The displayed regulatory text, in some embodiments, may be a visual representation of formatted regulatory content stored in the structured data object.

Within the text region 402, a substantively-relevant portion 404 of the text is identified. In some embodiments, a user of the user interface 400 may select the substantively-relevant portion 404. In other embodiments, the substantively-relevant portion 404 may have been automatically identified. Once identified, the user interface 400 may provide an annotation window 406 in order to generate an annotation that is to be associated with the substantively-relevant portion 404. The annotation window includes various options, such as a name field 408 to allow the user to name the annotation, a list of fields 410 for specifying various parameters of the annotation, such as those discussed throughout this disclosure. Although certain parameters are illustrated in the annotation window 406, it is to be understood that those shown are not exhaustive. In some embodiments, some of the parameters may be automatically populated (e.g., by the decision engine 170). For example, the processing device of the management server 140 may identify a defined term and associated definition in the substantively-relevant portion 404, and may populate the appropriate fields 410 with this information. The user may select a cancel button 412 to delete the annotation or discard edits, or select a confirmation button 414 to save the annotation (e.g., in the annotation database).

Referring once again to FIG. 3A, at block 360, the processing device generates a domain-specific data structure that is derived at least partially from the generated annotation and one or more annotations of the annotation database. In some embodiments, the domain-specific data structure is based at least partially on logical relationships between the generated annotation and one or more annotations of the annotation database. For a given mandate or regulation, the domain-specific data structure models eligibility and obligations. Eligibility may be divided into scopes (e.g., product scope, unilateral party scope, bilateral party scope, and transaction context scope), as discussed previously herein, with each scope being represented as a list of one or more inclusions and/or one or more exclusions. Inclusions are propositions about a particular product that render it in scope, while exclusions are propositions about the product that render it out of scope. An exemplary domain-specific data structure 370 is shown in FIG. 3B, which illustrates how various scopes are represented in terms of inclusions and exclusions for a given mandate.

The processing device may generate the domain-specific data structure by identifying annotations based on their associated scopes, and logically linking the information contained in the annotations. The domain-specific data structure may thus be utilized as an executable model for determining eligibility and scopes for a given mandate or rule based in response to a list of input parameters pertaining to details of a particular transaction.

In some embodiments, the processing device may receive a request to resolve a transactional inquiry to determine obligations of one or more parties associated with a transaction. The request may comprise a plurality of transaction-specific parameters, such as a particular financial product, geographical location information, and details associated various parties and their relationships to each other. The processing device then generates an indication of the obligations of the one or more parties based on the domain-specific data structure using the plurality of transaction-specific parameters as inputs.

Figure 5:
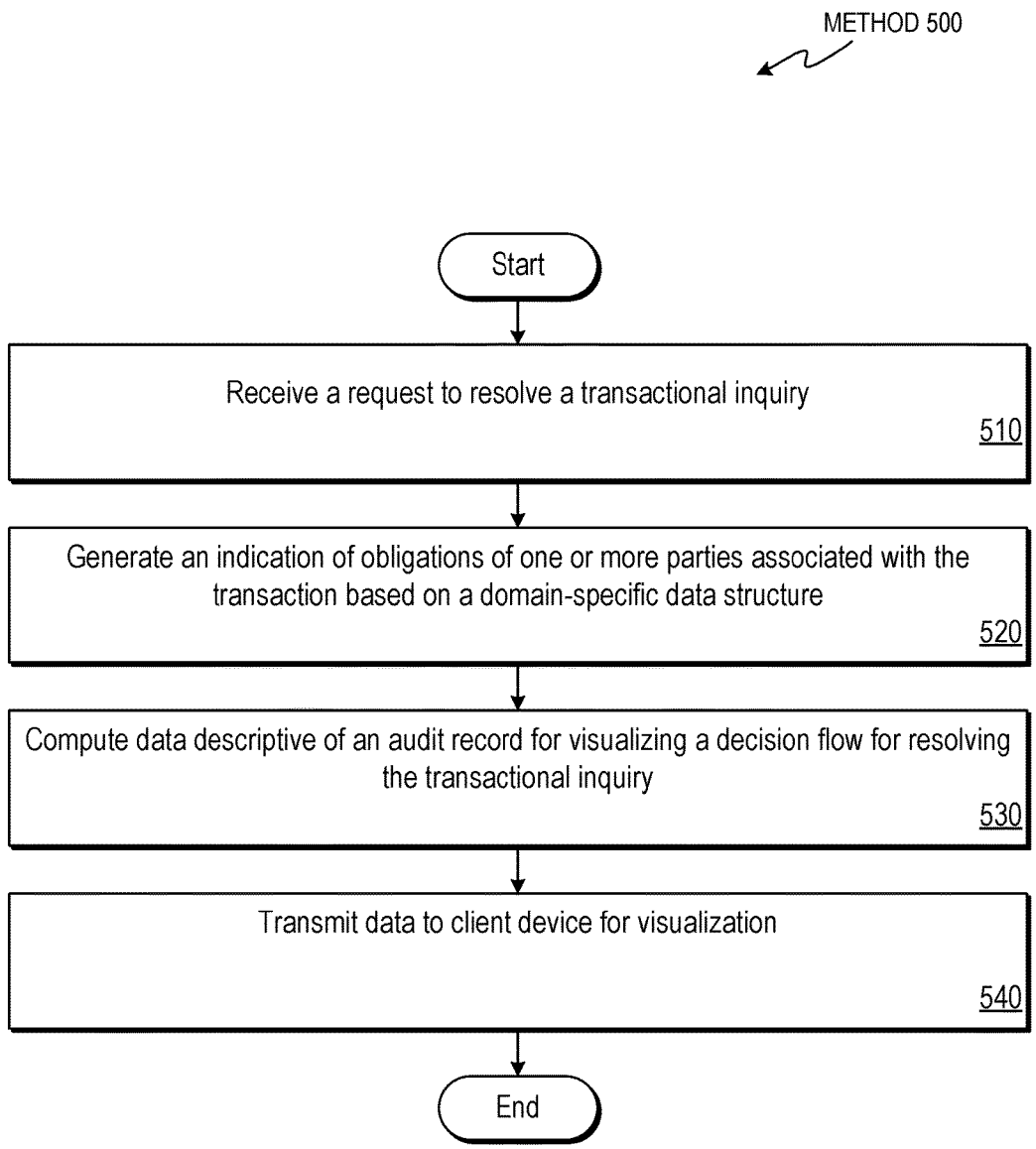
FIG. 5 is a flow diagram illustrating a method for rendering decisions in response to a transactional inquiry in accordance with an embodiment of the present disclosure.

FIG. 5 is a flow diagram illustrating a method 500 for rendering decisions in response to a transactional inquiry in accordance with an embodiment of the present disclosure. The method 500 may be performed by processing logic that includes hardware (e.g., circuitry, dedicated logic, programmable logic, microcode, etc.), software (e.g., instructions run on a processing device to perform hardware simulation), or a combination thereof. In one embodiment, the method 500 may be performed by a processing device executing one or more of the inquiry processing component 150, the regulations processing component 160, or the decision engine 170 described with respect to FIGS. 1 and 2. In some embodiments, the method 500 is executed by one or more processing devices of a server (e.g., the management server 140).

Referring to FIG. 5, the method 500 begins at block 510 where the processing device receives a request to resolve a transactional inquiry, for example, to determine obligations of one or more parties associated with the transaction. In some embodiments, the request is received from a client device (e.g., one of the client devices 120A-120Z). The request may include a plurality of transactions-specific parameters, including, but not limited to, party names, geographical information, mandate type, and asset class. In some embodiments, the inquiry may specify individual scopes to evaluate. For example, the request may indicate that a product scope should be evaluated. In some embodiments, the request may specify pre-computed scopes.

At block 520, the processing device generates an indication of obligations of the one or more parties associated with the transaction based on a domain-specific data structure. The domain-specific data structure may be computed, for example, based on the method of claim 300. Eligibility may be determined at the scope level for each scope associated with a particular mandate, or for particular scopes identified in the request. The processing device first determines, based on logical conditions defined by the domain-specific data structure, whether a particular product or event satisfies scope conditions. If the processing device determines that the product or event is in scope, the processing device then identifies obligations of the one or more parties under a particular rule modeled by the domain-specific data structure. The obligations, for example, may be indications of actions to perform, locations for which the action is to be performed. In some embodiments, if additional data is required for resolving the inquiry, such as missing information (e.g., if a geographical location of a particular party is missing from the request), the processing device might query available data sources to identify the missing information and automatically retrieve such information. In some embodiments, the domain-specific data structure is compiled into a different format, such as a machine-readable format, prior to use by the processing device.

At block 530, the processing device computes data descriptive of an audit record for visualizing a decision flow for resolving the transactional inquiry. During the analysis performed by the processing device, a path taken through the rules based on decisional logic encoded in the domain-specific data structure may be logged in real-time, with each decision resolved being stored as part of the audit record data that is used for visualization.

At block 540, the processing device transmits data generated by the processing device to the client device for visualization (e.g., using one or more of user interfaces 122A-122Z) and storage (e.g., using one or more of local data stores 124A-124Z). The data may include, for example, a summary of all input data provided and, for each mandate in the request, a list of decisions expressing eligibility either for all scopes of a given mandate or for each scope specified in the request and any determined obligations. In some embodiments, if the processing device determines that no parties have any obligations, the data will include an indication that the parties have no obligations. The data may also include the data descriptive of the audit record, including any reference data consumed in the analysis and all results.

In some embodiments, visualization of the data may be performed by the processing device (e.g., server-side visualization), with the user interface of the client device (e.g., one or more of user interfaces 122A-122Z), or both. FIGS. 6A and 6B illustrate an exemplary user interface 600 providing visualization of a transactional inquiry in accordance with an embodiment of the present disclosure. Referring to FIG. 6A, the user interface 600 includes a decision tree 602 that illustrates outcomes of the decisional logic of the domain-specific data structure to resolve a transactional inquiry. The decision tree 602 includes a start node 604, indicating the beginning of the decisional process and the order in which other nodes are visited. Decisional nodes 606 and 608 and result nodes 610 and 612 are also present in the decision tree 602. Node 618 may serve as an indicator of additional decisional logic that is hidden from view so as to not complicate the user interface 600. In some embodiments, a user selection of the node 618 may expand the decision tree 602 or display a different portion of the decision tree 602.

Each node is connected by paths 614 and 616. Paths 614, indicated as bold lines, correspond to paths that are actually traced out as a result of decision resolution. The path 614A, for example, connects the start node 604 and the decisional node 606 because the decisional node 606 may correspond to the first decision to be resolved for a particular mandate, and thus path 614A is the only path possible between these two nodes. Nodes 614B and 614C illustrate a logical path traced through nodes 606 and 608 to the node 616, for example, in response to a determination that the answer to the questions in the decisional nodes 606 and 608 is in the negative. The paths 616A and 616B represent paths not taken which, for example, would have led to the result nodes 610 if the answer to the question in the decisional node 606 was in the affirmative, or would have led to the results node 612 if the answer to the question in the decisional node 606 was in the negative but the answer to the question in the decisional node 608 was in the affirmative.

In some embodiments, the decision tree 602 may be updated to include additional decisional logic. This may occur, for example, in the scenario where the management server 140 identifies a new or updated document and generates one or more additional annotations, and these annotations, when processed, result in additional decisional logic integrated into an associated domain-specific data structure. This is illustrated in FIG. 6B, where the decision tree 602 has been updated to include an additional decisional node 620. As illustrated here, the decisional logic may result in a different outcome when executed for the same transactional inquiry. For example, the path 614D indicates that that the decisional logic reaches the result node 622 instead of the decisional node 606, for example, because the answer to the question associated with the decisional node 620 was in the affirmative. The path 616C indicates the path that would have reached the result node 612 had the answer been in the negative.

In some embodiments, a user may select (e.g., via mouse click) one or more of the nodes to receive information associated with the decisional logic. For example, clicking on the decisional node 608 may result in a display of transactional parameters and scopes used in evaluating the decision.

FIG. 6C illustrates a structured data object 650 that includes regulatory content in accordance with an embodiment of the present disclosure. Regulatory content may be formatted in accordance with a particular structured data object format. The underlined and bold text represents newly parsed content, which may have been identified and extracted from an updated document (a substantively-relevant portion of content, as described with respect to FIG. 3A). For example, the new content may be deemed substantively-relevant because it was not present in a previous version of the document or the domain-specific data structure. The new content may then serve as the basis for a new annotation, which may result in an updated domain-specific data object having additional decisional logic encoded therein (e.g., as illustrated by the introduction of decisional node 620 of FIG. 6B).

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture", as used herein, is intended to encompass a computer program accessible from any computer-readable device or storage media.

Although embodiments of the present disclosure were discussed in terms of processing regulatory data, the embodiments may also be generally applied to any system in which data scraping and parsing of large quantities of documents into decisional models is applicable. Thus, embodiments of the present disclosure are not limited to regulatory content.

Figure 7:
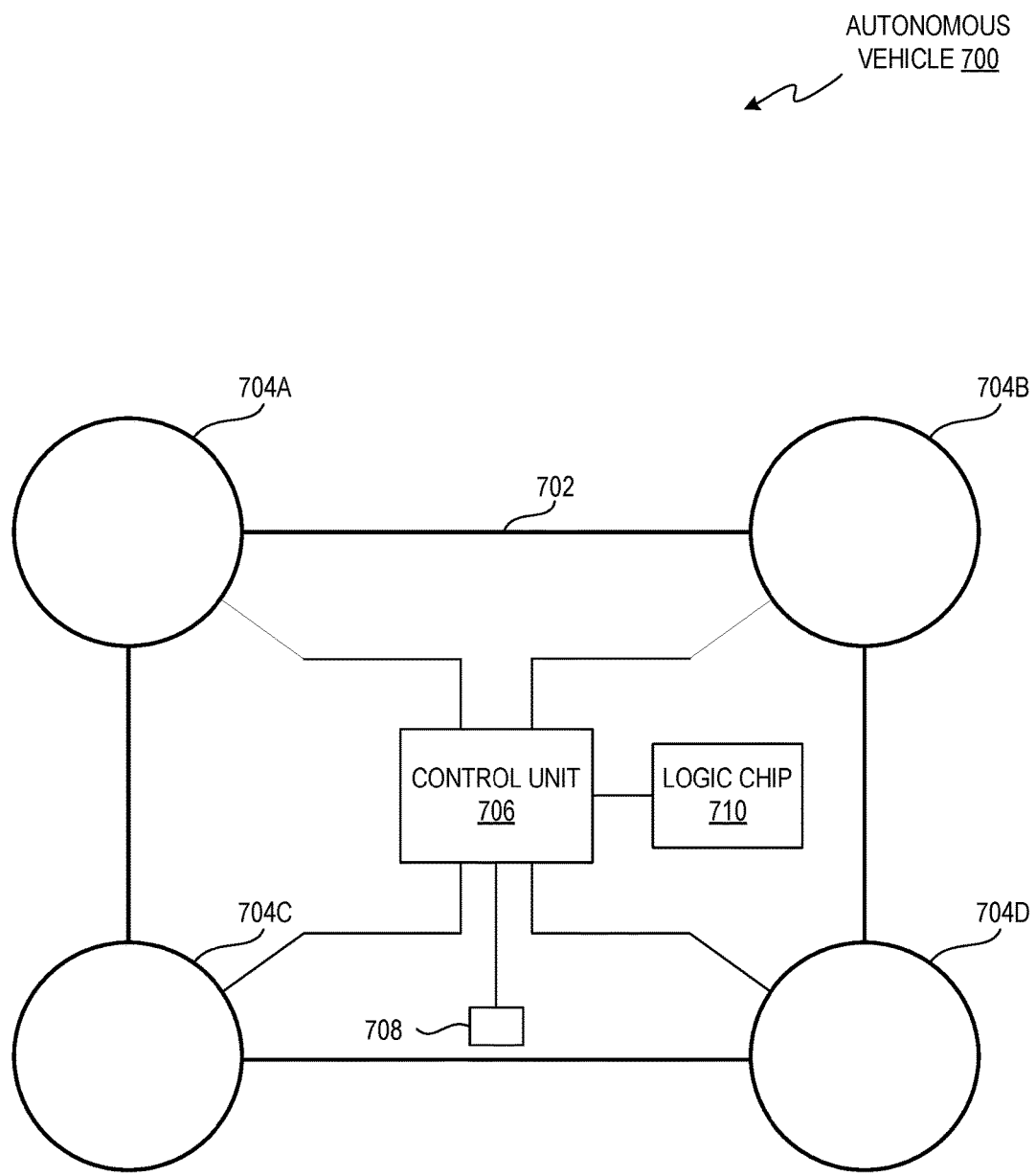
FIG. 7 is a diagram illustrating an autonomous vehicle utilizing a logic chip in accordance with an embodiment of the present disclosure.

FIG. 7 is a diagram illustrating an autonomous vehicle 700 utilizing a logic chip 710 in accordance with an embodiment of the present disclosure. The autonomous vehicle 700 illustrated in FIG. 7 is depicted as an autonomous drone, but it is contemplated that other types of autonomous vehicles may be utilized, such as driverless automobiles. The autonomous vehicle 700 includes a housing 702, which surrounds and protects a control unit 708 and the logic chip 710. Motors 704A-D are coupled to the housing 702, which, when activated, drive the movement of the autonomous vehicle 700. For example, the motors 704A-D may have rotors coupled thereto that can be controlled to impart thrust and turning force to the autonomous vehicle 700.

The control unit 708 may be any type of computing device suitable for use in an autonomous vehicle, and may include one or more of the devices of the computer system 900, described below with respect to FIG. 9. The motors 704A-D are operatively coupled to the control unit 708, which transmits signals to each individual motor 704A-D to activate/deactivate them and control how much power they receive. Sensors 708 are coupled to the body 702, which may include any of a light sensor, a sound sensor, an inertial measurement unit, or any other suitable sensor useful in the control of the autonomous vehicle 700, as would be appreciated by one of ordinary skill in the art. The sensors 708 may be used to generate feedback signals that are provided to and processed by the control unit 706. The signals may include, but are not limited to, altitude, translational velocity, translational acceleration, rotational velocity, rotational acceleration, temperature, humidity, audio, video, light intensity, or any other measurable signal that may facilitate the operation of the autonomous vehicle 700.

Figure 8:
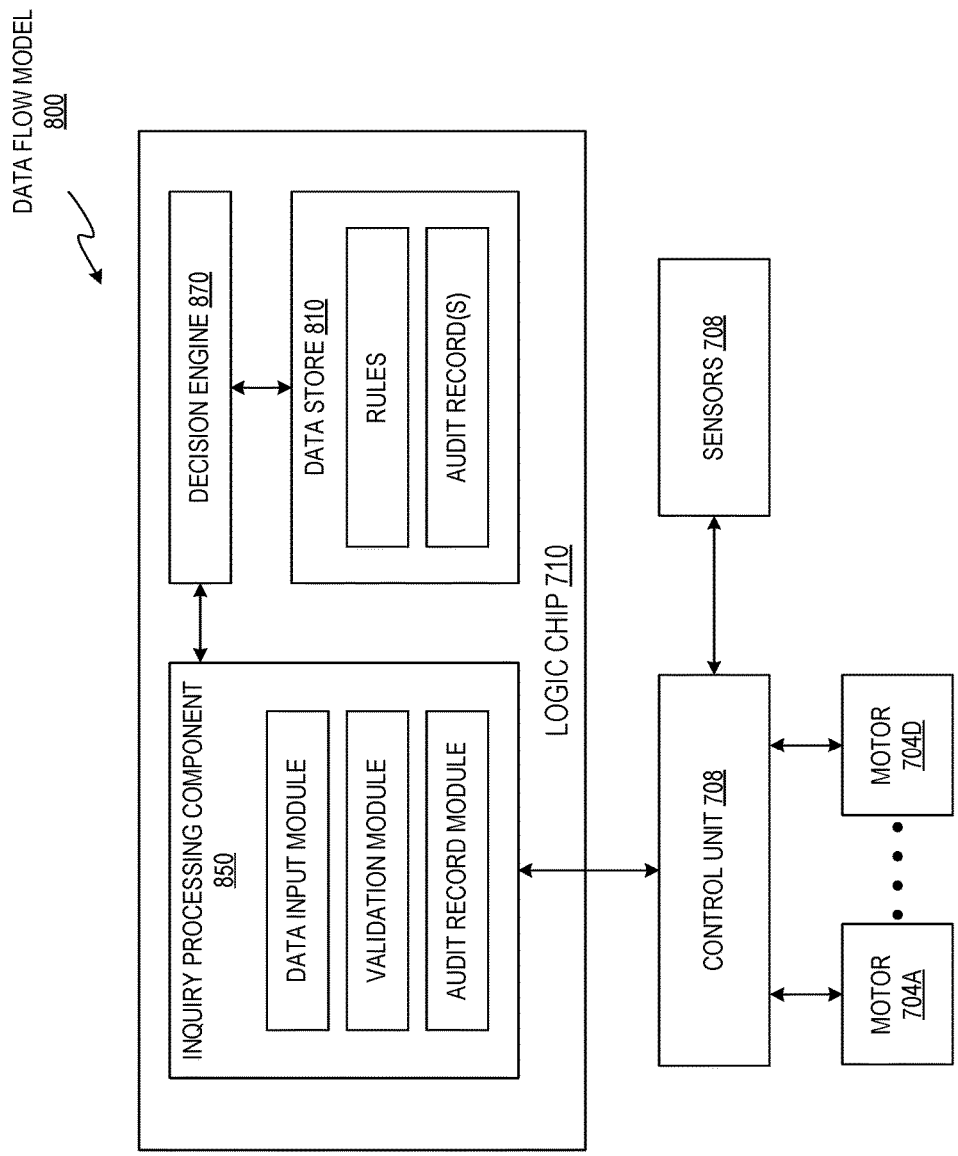
FIG. 8 illustrates an exemplary data flow model for an autonomous vehicle in accordance with an embodiment of the present disclosure.

The logic chip 710 may be any type of computing device suitable for use in an autonomous vehicle, and may include one or more of the devices of the computer system 900, described below with respect to FIG. 9. In some embodiments, the logic chip 710 may be a separate device from the control unit 708, or may be embedded within the control unit 708. In some embodiments, the logic chip 710 includes an application specific integrated circuit (ASIC) that is configured to provide at least some of the functionality of the management server 140 described with respect to FIG. 1. For example, as illustrated in the data flow model 800 of FIG. 8, the logic chip 710 may implement an inquiry processing component 850 and a decision engine 870, which may be the same as or similar to the identically named components described with respect to FIGS. 1 and 2. The logic chip 710 may further include a data store 810 for storing rules describing decisional logic for resolving inquiries and for storing audit records. In some embodiments, the audio records are not stored on the logic chip 710, and may be stored, for example, by the control unit 708 or on a remote device (e.g., transmitted to the remote device by the control unit 708).

The logic chip 710 is operatively coupled to the control unit 706. In some embodiments, the control unit 706 may transmit signals received from the sensors 708 to the logic chip 710 in processed or unprocessed form. The control unit 708 may extract data from the signals which may be stored as variables that define a state space for the operation of the autonomous vehicle 700. For example, the states can be discrete or continuous, and may include, but are not limited to, physical characteristics such as position (e.g., relative to a static reference frame or other moving objects), velocity, acceleration, and orientation. The states may also include legal designation or statuses, such as whether the autonomous vehicle 700 is located in a restricted airspace, the observation of traffic signals, etc. In some embodiments, the states may include states of other autonomous vehicles, non-autonomous vehicles, and other objects. The control unit 708 may be configured for sending information regarding its own states to other devices and receiving information regarding the states of other devices via a network (e.g., the network 105).

In some embodiments, the logic chip 710 is stateless (i.e., agnostic to the current or past states of the control unit 706). In other embodiments, the logic chip 710 may be stateful (i.e., retains or utilizes data related to a current or past state). In some embodiments, when the control unit 706 detects a change in state (e.g., a delta in one or more of the variables), at least a subset of the state information is transmitted to the logic chip 710 as an inquiry (similar to the transactional inquiries discussed herein). The logic chip 710 may resolve the inquiry by determining whether the new state is permitted based on a domain-specific data structure specific to resolving such inquiries. The domain-specific data structure may define scopes derived from laws, rules, and regulations pertaining to the operation of autonomous vehicles. For example, if a change in state corresponds to a change in altitude, the logic chip 710 may determine that that particular altitude within a particular geographic region is not permitted, and may transmit an indication to the control unit 706, which in turn adjusts the altitude until the logic chip 710 determines that the current altitude is permissible. For each transaction resolved, the logic chip 710 may generate an audit record, which may be stored, for example, by the logic chip 710 or the control unit 706, and/or may be transmitted to a remote device for storage (e.g., in real-time). The implementation of the stateless logic chip 710 as an ASIC having encoded thereon the decisional logic as described herein may dramatically improve the speed of the inquiry resolution compared to, for example, an on-board general purpose processing device or a system wherein the control unit 706 communicates with a remote device or system to evaluate the actions of the autonomous vehicle 700. In some embodiments, the rules utilized by the logic chip 710 may be updated. The rules may be updated, for example, without replacing the logic chip 710 or requiring that the update be performed locally by personnel. In such embodiments, the updated rules may be transmitted wirelessly to the logic chip 710 from a remote source, and subsequently stored in the data store 810. Updates to the rules may be performed efficiently, in some embodiments, by overwriting or replacing specific rules without affecting other rules that are not to be changed.

Figure 9:
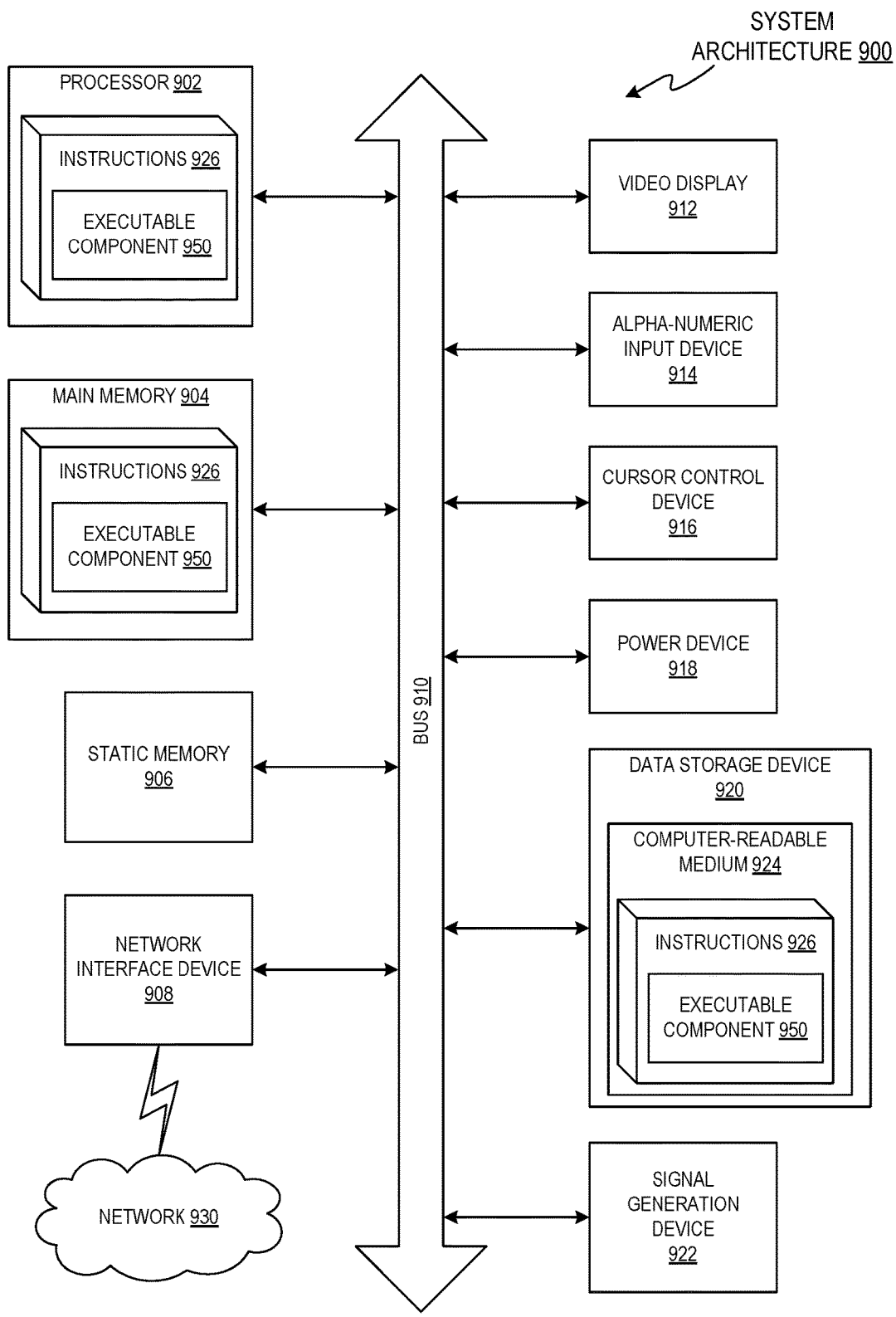
FIG. 9 is a block diagram illustrating an exemplary computer system in accordance with an embodiment of the present disclosure.

FIG. 9 illustrates a diagrammatic representation of a machine in the exemplary form of a computer system 900 within which a set of instructions (e.g., for causing the machine to perform any one or more of the methodologies discussed herein) may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 900 may be utilized by or illustrative of any of the data store 110, one or more of the client devices 120A-120Z, one or more of the data servers 130A-130Z, and the management server 140.

The exemplary computer system 900 includes a processing device (processor) 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 920, which communicate with each other via a bus 910.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an ASIC, a field programmable gate array (FPGA), a digital signal processor (DSP), network processor, or the like. The processor 902 is configured to execute instructions 926 for performing the operations and steps discussed herein.

The computer system 900 may further include a network interface device 908. The computer system 900 also may include a video display unit 912 (e.g., a liquid crystal display (LCD), a cathode ray tube (CRT), or a touch screen), an alphanumeric input device 914 (e.g., a keyboard), a cursor control device 916 (e.g., a mouse), and a signal generation device 922 (e.g., a speaker).

Power device 918 may monitor a power level of a battery used to power the computer system 900 or one or more of its components. The power device 918 may provide one or more interfaces to provide an indication of a power level, a time window remaining prior to shutdown of computer system 900 or one or more of its components, a power consumption rate, an indicator of whether computer system is utilizing an external power source or battery power, and other power related information. In some embodiments, indications related to the power device 918 may be accessible remotely (e.g., accessible to a remote back-up management module via a network connection). In some embodiments, a battery utilized by the power device 918 may be an uninterruptable power supply (UPS) local to or remote from computer system 900. In such embodiments, the power device 918 may provide information about a power level of the UPS.

The data storage device 920 may include a computer-readable storage medium 924 on which is stored one or more sets of instructions 926 (e.g., software) embodying any one or more of the methodologies or functions described herein. The instructions 926 may also reside, completely or at least partially, within the main memory 904 and/or within the processor 902 during execution thereof by the computer system 900, the main memory 904 and the processor 902 also constituting computer-readable storage media. The instructions 926 may further be transmitted or received over a network 930 (e.g., the network 105) via the network interface device 908.

In one embodiment, the instructions 926 include instructions for a executable component 950, which may be representative of one or more of the components described with respect to FIGS. 1 and 2 (e.g., the inquiry processing component 150, the regulations processing component 160, and the decision engine 170). While the computer-readable storage medium 924 is shown in an exemplary embodiment to be a single medium, the terms "computer-readable storage medium" or "machine-readable storage medium" should be taken to include a single medium or multiple media (e.g., a centralized or distributed database, and/or associated caches and servers) that store the one or more sets of instructions. The terms "computer-readable storage medium" or "machine-readable storage medium" shall also be taken to include any transitory or non-transitory medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "receiving", "retrieving", "transmitting", "computing", "generating", "adding", "subtracting", "multiplying", "dividing", "selecting", "parsing", "optimizing", "calibrating", "detecting", "storing", "performing", "analyzing", "determining", "enabling", "identifying", "modifying", "transforming", "applying", "aggregating", "extracting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus, device, or system for performing the operations herein. This apparatus, device, or system may be specially constructed for the required purposes, or it may include a general purpose computer selectively activated or reconfigured by a computer program stored in the computer. Such a computer program may be stored in a computer- or machine-readable storage medium, such as, but not limited to, any type of disk including floppy disks, optical disks, compact disk read-only memories (CD-ROMs), and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an embodiment" or "one embodiment" means that a particular feature, structure, or characteristic described in connection with the embodiment is included in at least one embodiment. Thus, the appearances of the phrase "an embodiment" or "one embodiment" in various places throughout this specification are not necessarily all referring to the same embodiment. Moreover, it is noted that the "A-Z" notation used in reference to certain elements of the drawings is not intended to be limiting to a particular number of elements. Thus, "A-Z" is to be construed as having one or more of the element present in a particular embodiment.

The present disclosure is not to be limited in scope by the specific embodiments described herein. Indeed, other various embodiments of and modifications to the present disclosure, in addition to those described herein, will be apparent to those of ordinary skill in the art from the preceding description and accompanying drawings. Thus, such other embodiments and modifications are intended to fall within the scope of the present disclosure. Further, although the present disclosure has been described herein in the context of a particular embodiment in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A method for resolving legal or regulatory inquires and generating audit records, the method comprising:
    aggregating, by a processing device, documents from a plurality of data sources and storing the aggregated documents in a document database, wherein each document comprises legal and regulatory content for a legal and regulatory domain;
    selecting, by the processing device, a first document from the document database, the first document being expressed in a first format;
    converting, by the processing device, the first document into a structured data object, wherein the structured data object is expressed in a structured data format independent of the first format of the first document;
    generating, by the processing device, a plurality of annotations associated with the structured data object, wherein each annotation is associated with a data structure representing logic within the legal and regulatory content, and the plurality of annotations form a comprehensive data structure representing the entire logic within the legal and regulatory content;
    storing, by the processing device, the generated annotations in an annotation database comprising annotations associated with the documents in the document database;
    transforming, by the processing device, the structured data object into a domain-specific data structure, wherein the domain-specific data structure comprises a compiled executable logical model for decision making to resolve transactional inquiries in the legal and regulatory domain, wherein the domain-specific data structure is derived at least partially from one or more logical relationships between the generated annotations and one or more annotations of the annotation database;
    receiving, by the processing device, a request to resolve an inquiry in the legal and regulatory domain pertaining to a proposed transaction, wherein the request comprises a plurality of transaction-specific parameters;
    executing, by the processing device, the compiled executable logical model, using the plurality of transaction-specific parameters as inputs, to resolve the inquiry; and
    generating, by the processing device, an audit record comprising a visualization of the executable logical model, how each decision in the executable logical model was made, and the resolution of the inquiry.

2. The method of claim 1, wherein one or more of the annotations comprises a taxonomy of a rule, a scope to which the rule applies, and a classification of the annotation.

3. The method of claim 2, wherein the one or more of the annotations further comprises one or more of a definition of a legislative term, a definition of a data element, a cross-reference to another annotation, an expression of a relationship between entities, or an expression of a relationship between data elements.

4. The method of claim 1, wherein generating the plurality of annotations comprises extracting a rule-specific indicator from the legal and regulatory content.

5. The method of claim 4, wherein the processing device utilizes a natural language processing algorithm to identify the rule-specific indicator within the legal and regulatory content.

6. The method of claim 1, wherein the request to resolve an inquiry in the legal and regulatory domain pertaining to a proposed transaction comprises determining obligations of one or more parties associated with the transaction; and wherein the method further comprises generating, by the processing device, an indication of the obligations of the one or more parties based on the domain-specific data structure using the plurality of transaction-specific parameters as inputs.

7. The method of claim 1, further comprising: determining, by the processing device, that the first document corresponds to an updated version of a previously-stored document in the document database, wherein the updated version corresponds to legal and regulatory content not present in the previously stored document.

8. The method of claim 1, wherein aggregating the documents from the plurality of data sources comprises: identifying, by the processing device, one or more documents available from the plurality of data sources that have associated hash values that differ from hash values associated with any of the documents previously stored in the document database; and retrieving, by the processing device, the one or more documents and storing the one or more documents in the document database.

9. The method of claim 1, further comprising: selecting, by the processing device, the plurality of data sources from which to aggregate the documents based on a target regulation category.

10. The method of claim 1, further comprising periodically reaggregating, by the processing device, the documents from the plurality of data sources and calculating a hash value for each document to detect changes to the documents.

11. The method of claim 1, wherein the legal and regulatory content comprises one or more of: a law, a regulation, a rule, a legal text, a policy text, and a legal guidance.

12. The method of claim 1, wherein the visualization comprises a logic flow chart.

13. A system for resolving legal or regulator inquires and generating audit records, the system comprising:
    a data store for maintaining a document database and an annotation database; and
    one or more processing devices communicatively coupled to the data store, wherein the one or more processing devices are configured to:
        aggregate documents from a plurality of data sources and store the aggregated documents in the document database, wherein each document comprises legal and regulatory content for a legal and regulatory domain;
        select a first document from the document database, the first document being expressed in a first format;
        convert the first document into a structured data object, wherein the structured data object is expressed in a structured data format independent of the first format of the first document;

generate a plurality of annotations associated with the structured data object, wherein each annotation is associated with a data structure representing logic within the legal and regulatory content, and the plurality of annotations form a comprehensive data structure representing the entire logic within the legal and regulatory content;

store the generated annotation in the annotation database comprising annotations associated with the documents in the document database; and transform the structured data object into a domain-specific data structure, wherein the domain-specific data structure comprises a compiled executable logical model for decision making to resolve transactional inquiries in the legal and regulatory domain, wherein the domain-specific data structure is derived at least partially from one or more logical relationships between the generated annotations and one or more annotations of the annotation database;

receive a request to resolve an inquiry in the legal and regulatory domain pertaining to a proposed transaction, wherein the request comprises a plurality of transaction-specific parameters;

execute the compiled executable logical model, using the plurality of transaction-specific parameters as inputs, to resolve the inquiry; and generate an audit record comprising a visualization of the executable logical model, how each decision in the executable logical model was made, and the resolution of the inquiry.

14. The system of claim 13, wherein one or more of the annotations comprises a taxonomy of a rule, a scope to which the rule applies, and a classification of the annotation, and wherein the one or more of the annotations further comprises one or more of a definition of a legislative term, a definition of a data element, a cross-reference to another annotation, an expression of a relationship between entities, or an expression of a relationship between data elements.

15. The system of claim 13, wherein to generate the plurality of annotations, the processing device is further configured to extract a rule-specific indicator from the legal and regulatory content, and wherein the processing device is further configured to utilize a natural language processing algorithm to identify the rule-specific indicator within the legal and regulatory content.

16. The system of claim 13, wherein the request to resolve an inquiry in the legal and regulatory domain pertaining to a proposed transaction comprises determining obligations of one or more parties associated with the transaction; and wherein the one or more processing devices are further configured to generate an indication of the obligations of the one or more parties based on the domain-specific data structure using the plurality of transaction-specific parameters as inputs.

17. The system of claim 13, wherein the one or more processing devices are further configured to periodically reaggregate the documents from the plurality of data sources and calculate a hash value for each document to detect changes to the documents.

18. The system of claim 13, wherein the legal and regulatory content comprises one or more of: a law, a regulation, a rule, a legal text, a policy text, and a legal guidance.

19. The system of claim 13, wherein the visualization comprises a logic flow chart.

20. A non-transitory computer-readable storage medium having instructions encoded thereon that, when executed by a processing device, cause the processing device to resolve legal or regulatory inquires and generate audit records by performing at least:

aggregate documents from a plurality of data sources and store the aggregated documents in a document database, wherein each document comprises legal and regulatory content for a legal and regulatory domain;

select a first document from the document database, the first document being expressed in a first format;

convert the first document into a structured data object, wherein the structured data object is expressed in a structured data format independent of the first format of the first document;

generate a plurality of annotations associated with the structured data object, wherein each annotation is associated with a data structure representing logic within the legal and regulatory content, and the plurality of annotations form a comprehensive data structure representing the entire logic within the legal and regulatory content;

store the generated annotation in an annotation database comprising annotations associated with the documents in the document database; and transform the structured data object into a domain-specific data structure, wherein the domain-specific data structure comprises a compiled executable logical model for decision making to resolve transactional inquiries in the legal and regulatory domain, wherein the domain-specific data structure is derived at least partially from one or more logical relationships between the generated annotation and one or more annotations of the annotation database;

receive a request to resolve an inquiry in the legal and regulatory domain pertaining to a proposed transaction, wherein the request comprises a plurality of transaction-specific parameters;

execute the compiled executable logical model, using the plurality of transaction-specific parameters as inputs, to resolve the inquiry; and generate an audit record comprising a visualization of the executable logical model, how each decision in the executable logical model was made, and the resolution of the inquiry.

21. The non-transitory computer-readable storage medium of claim 20, wherein one or more of the annotations comprises a taxonomy of a rule, a scope to which the rule applies, and a classification of the annotation, and wherein the one or more of the annotations further comprises one or more of a definition of a legislative term, a definition of a data element, a cross-reference to another annotation, an expression of a relationship between entities, or an expression of a relationship between data elements.

22. The non-transitory computer-readable storage medium of claim 20, wherein to generate the plurality of annotations, the instructions, when executed by the processing device, further cause the processing device to extract a rule-specific indicator from the legal and regulatory content, and wherein the instructions, when executed by the processing device, further cause the processing device is to utilize a natural language processing algorithm to identify the rule-specific indicator within the legal and regulatory content.

23. The non-transitory computer-readable storage medium of claim 20, wherein the request to resolve an inquiry in the legal and regulatory domain pertaining to a proposed transaction comprises determining obligations of one or more parties associated with the transaction; and wherein the instructions, when executed by the processing device, further cause the processing device to generate an indication of the obligations of the one or more parties based on the domain-specific data structure using the plurality of transaction-specific parameters as inputs.

24. The non-transitory computer-readable storage medium of claim 20, wherein the instructions, when executed by the processing device, further cause the processing device to periodically reaggregate the documents from the plurality of data sources and calculate a hash value for each document to detect changes to the documents.

25. The non-transitory computer-readable storage medium of claim 20, wherein the legal and regulatory content comprises one or more of: a law, a regulation, a rule, a legal text, a policy text, and a legal guidance.

26. The non-transitory computer-readable storage medium of claim 20, wherein the visualization comprises a logic flow chart.

\* \* \* \* \*

UNITED STATES PATENT AND TRADEMARK OFFICE
CERTIFICATE OF CORRECTION

| | |
|---|---|
| PATENT NO. | : 10,509,813 B1 |
| APPLICATION NO. | : 15/995984 |
| DATED | : December 17, 2019 |
| INVENTOR(S) | : Satyanarayana V. Pemmaraju et al. |

It is certified that error appears in the above-identified patent and that said Letters Patent is hereby corrected as shown below:

In the Claims

Column 21, Line 10, Claim 13, the portion "documents in the document database; and transform the structured data object into a domain-"
Should read -- documents in the document database; transform the structured data object into a domain- --

Column 22, Line 23, Claim 20, the portion "in the document database; and transform the structured data object into a domain-specific"
Should read -- in the document database; transform the structured data object into a domain-specific --

Signed and Sealed this
Twenty-first Day of July, 2020

Andrei Iancu
*Director of the United States Patent and Trademark Office*